(12) United States Patent
Zauner et al.

(10) Patent No.: US 12,209,519 B2
(45) Date of Patent: Jan. 28, 2025

(54) DEVICE AND METHOD FOR DETERMINING AN OFFSET IN A SIGNAL OF A SENSOR FOR MEASURING RESIDUAL OXYGEN

(71) Applicant: Robert Bosch GmbH, Stuttgart (DE)

(72) Inventors: Julian Tobias Zauner, Kornwestheim (DE); Michael Fey, Wiernsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 119 days.

(21) Appl. No.: 18/295,189

(22) Filed: Apr. 3, 2023

(65) Prior Publication Data

US 2023/0340900 A1 Oct. 26, 2023

(30) Foreign Application Priority Data

Apr. 26, 2022 (DE) ..................... 10 2022 204 003.1

(51) Int. Cl.
*F01N 11/00* (2006.01)
*F02D 41/14* (2006.01)
(Continued)

(52) U.S. Cl.
CPC ......... *F01N 11/007* (2013.01); *G01M 15/104* (2013.01); *F01N 2430/06* (2013.01);
(Continued)

(58) Field of Classification Search
CPC .... F01N 9/007; F01N 11/007; F01N 2430/06; F01N 2550/02; F01N 2560/02; F01N 2560/025; F01N 2560/14; F01N 2570/16; F01N 2900/04; F01N 2900/0408; F01N 2900/0412; F01N 2900/0414; F01N 2900/0416; F01N 2900/1624;
(Continued)

(56) References Cited

U.S. PATENT DOCUMENTS

2007/0079596 A1* 4/2007 Asano ................. F02D 41/0295
60/276
2008/0087259 A1* 4/2008 Kato ................... F02D 41/1458
123/672

(Continued)

FOREIGN PATENT DOCUMENTS

| DE | 102016220850 B3 | 10/2017 |
| DE | 102016222418 A1 | 5/2018 |
| DE | 102018251725 A1 | 7/2020 |

*Primary Examiner* — Binh Q Tran
(74) *Attorney, Agent, or Firm* — NORTON ROSE FULBRIGHT US LLP; Gerard A. Messina

(57) ABSTRACT

Device and method for correcting an offset in a signal of a first sensor for determining a residual oxygen content in an exhaust gas. A first actual ratio of air and fuel being determined as a function of a first residual oxygen content, a second actual ratio of air and fuel being determined as a function of a second residual oxygen content, a first offset of a first actual ratio relative to a reference ratio being determined for the first actual ratio when the second actual ratio is greater than the reference ratio, a second offset of a first actual ratio relative to the reference ratio being determined for the first actual ratio when the second actual ratio is smaller than the reference ratio, and a deviation being detected between the first offset and the second offset.

14 Claims, 3 Drawing Sheets

(51) Int. Cl.
*F02D 41/24* (2006.01)
*G01M 15/10* (2006.01)

(52) U.S. Cl.
CPC ...... *F01N 2550/02* (2013.01); *F01N 2560/02* (2013.01); *F01N 2900/0416* (2013.01); *F01N 2900/1624* (2013.01); *F02D 41/1455* (2013.01); *F02D 41/2454* (2013.01)

(58) Field of Classification Search
CPC .. F02D 41/0295; F02D 41/14; F02D 41/1401; F02D 41/1441; F02D 41/1454; F02D 41/1455; F02D 41/1456; F02D 41/1463; F02D 41/1475; F02D 41/2454; F02D 41/2474; F02D 2200/0814; F02D 2200/0816; G01M 15/104
See application file for complete search history.

(56) References Cited

U.S. PATENT DOCUMENTS

| | | | | |
|---|---|---|---|---|
| 2009/0288391 | A1* | 11/2009 | Aoki | F01N 13/0093 |
| | | | | 123/704 |
| 2012/0271534 | A1* | 10/2012 | Kachi | F02D 41/0235 |
| | | | | 701/108 |
| 2012/0324869 | A1* | 12/2012 | Nakamura | F01N 11/007 |
| | | | | 60/276 |
| 2013/0133635 | A1* | 5/2013 | Genko | F02D 41/1475 |
| | | | | 123/674 |
| 2017/0159592 | A1* | 6/2017 | Okazaki | F02D 41/1495 |
| 2017/0356363 | A1* | 12/2017 | Jammoussi | F02D 41/1444 |
| 2020/0217264 | A1* | 7/2020 | Inoshita | F02D 41/2461 |

\* cited by examiner

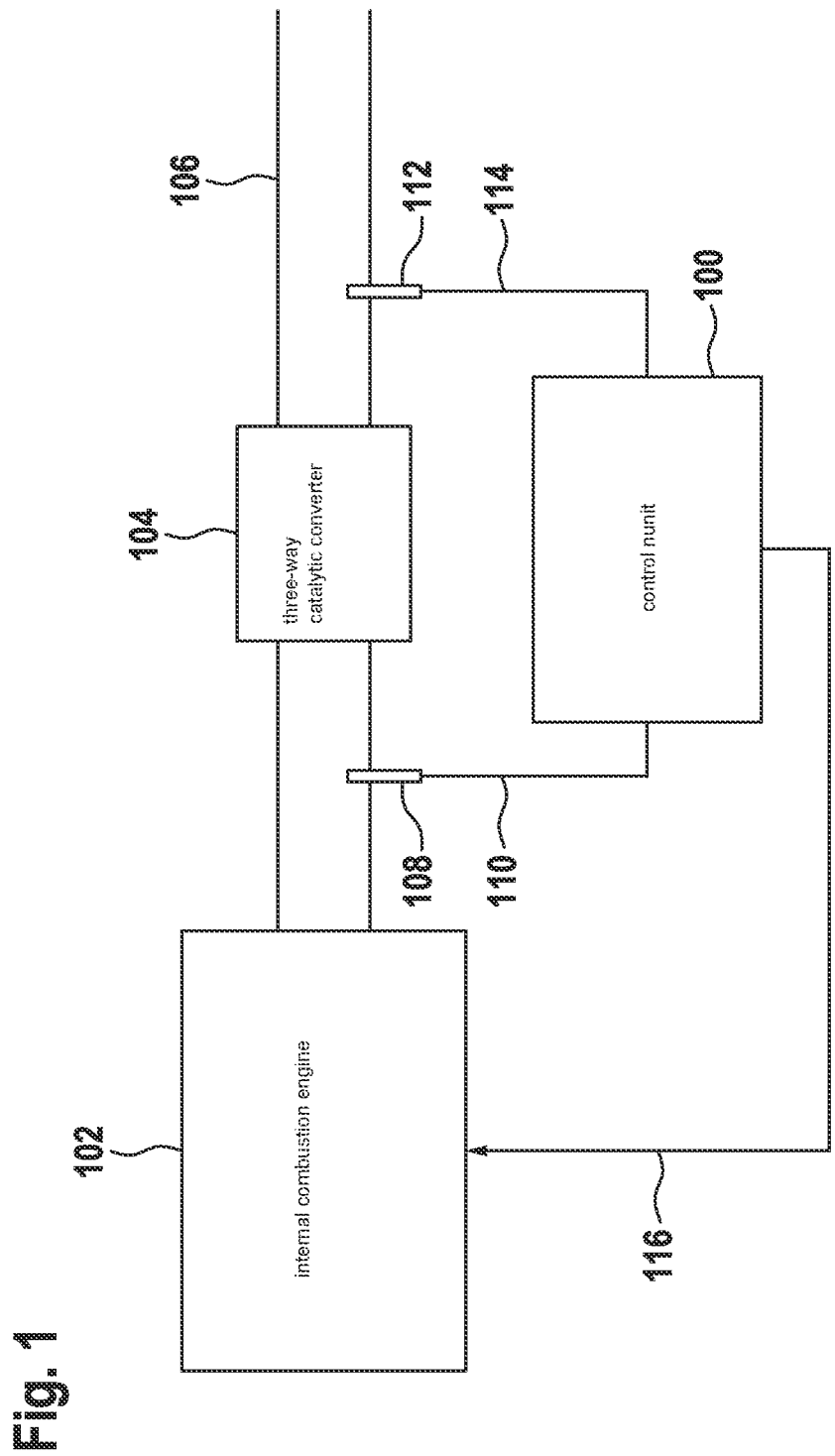

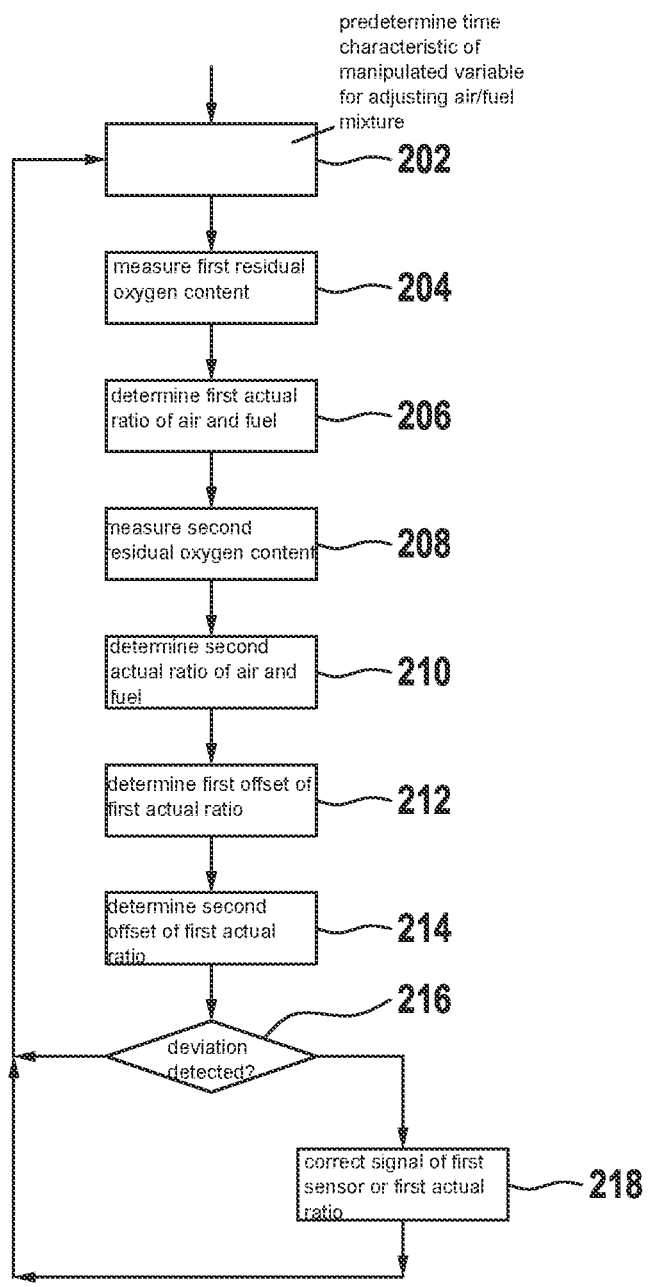

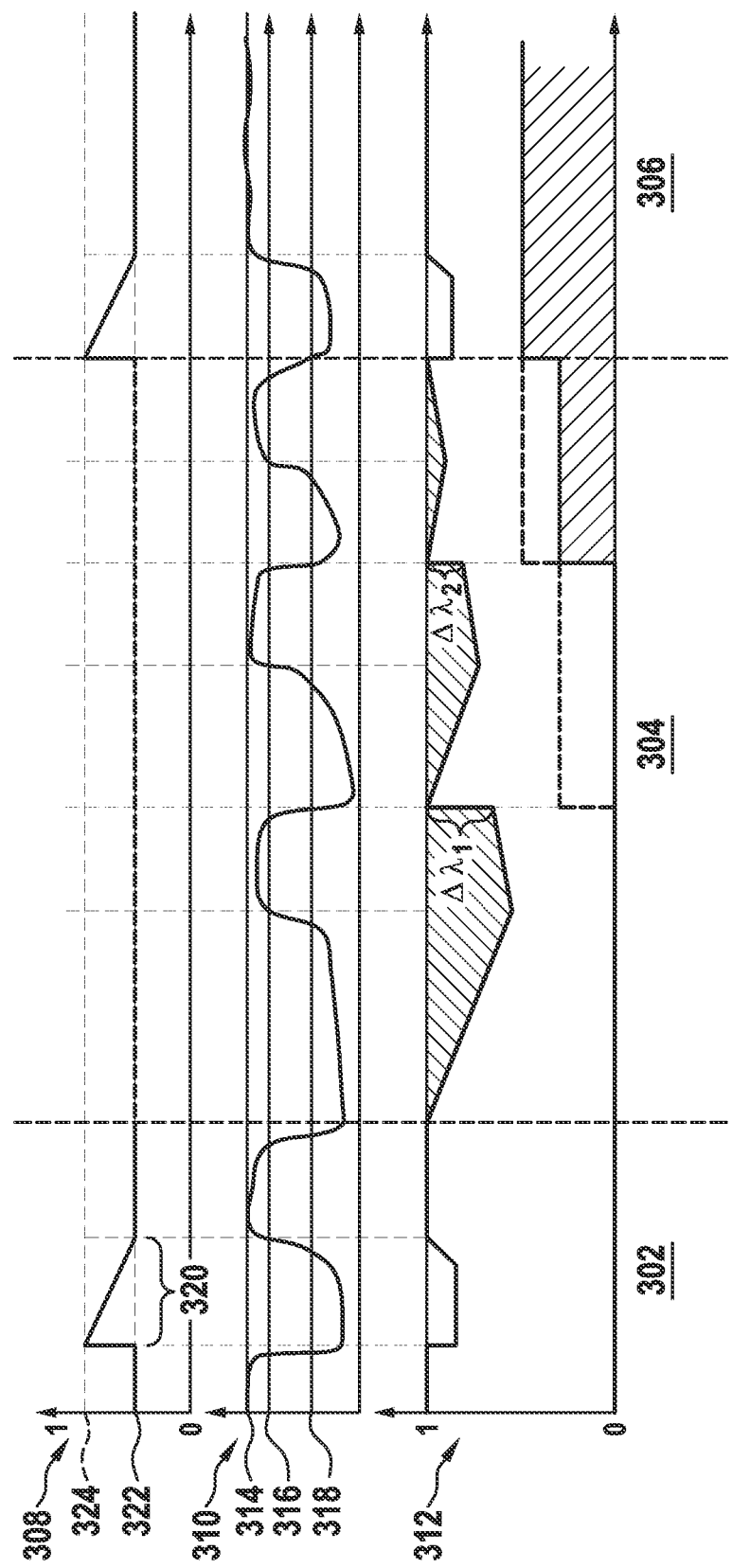

DEVICE AND METHOD FOR DETERMINING AN OFFSET IN A SIGNAL OF A SENSOR FOR MEASURING RESIDUAL OXYGEN

CROSS REFERENCE

The present application claims the benefit under 35 U.S.C. § 119 of German Patent Application No. DE 10 2022 204 003.1 filed on Apr. 26, 2022, which is expressly incorporated herein by reference in its entirety.

FIELD

The present invention relates to a device and a method for determining a ratio between air and fuel in an exhaust gas using a sensor for measuring residual oxygen.

BACKGROUND INFORMATION

German Patent Application No. DE 10 2016 220 850 B3 describes a method for operating a drive device with a drive unit and an exhaust-gas treatment device having such a sensor.

SUMMARY

A device and method according to the present are an improvement owing to the fact that an offset in the signal of the sensor is detected and compensated for in more reliable fashion.

According to an example embodiment of the present invention, the method for correcting an offset in a signal of a first sensor for determining a residual oxygen content in an exhaust gas provides that a reference ratio of air and fuel is predetermined for an output of a catalytic converter, a first residual oxygen content in the exhaust gas being measured upstream of the catalytic converter by the first sensor, a first actual ratio of air and fuel being determined as a function of the first residual oxygen content, a second residual oxygen content in the exhaust gas being measured downstream of the catalytic converter by a second sensor which is designed to determine the residual oxygen content in the exhaust gas, a second actual ratio of air and fuel being determined as a function of the second residual oxygen content, a first offset of a first actual ratio relative to the reference ratio being determined for the first actual ratio in the case where the second actual ratio is greater than the reference ratio, a second offset of a first actual ratio relative to the reference ratio being determined for the first actual ratio in the case where the second actual ratio is smaller than the reference ratio, and a deviation being detected between the first offset and the second offset. The deviation is detected reliably in this manner.

According to an example embodiment of the present invention, the method preferably provides that if the deviation between the first offset and the second offset is detected, the signal of the first sensor or the first actual ratio is corrected. Low emissions are thus achieved in reliable fashion.

According to an example embodiment of the present invention, preferably, the signal of the first sensor or the first actual ratio is corrected with a correction value, the correction value being determined as a function of the deviation or the deviation in terms of its amount. The correction is thereby achieved quickly.

According to an example embodiment of the present invention, preferably, the correction value is determined as a function of a factor, the deviation being multiplied by the factor. The correction may thus be established in the application.

According to an example embodiment of the present invention, preferably, a time characteristic of a manipulated variable is predetermined for adjusting an air/fuel mixture whose combustion gives rise to the exhaust gas, particularly a time characteristic of the manipulated variable which includes a jump of the manipulated variable, a ramp-shaped characteristic of the manipulated variable, or a combination of a jump of the manipulated variable with a subsequent ramp of the manipulated variable. Low emissions are achieved quickly in this manner.

A correction may be omitted if it is detected that the deviation is smaller in amount than a limit value, particularly zero. Consequently, the correction is avoided for small deviations.

According to an example embodiment of the present invention, the signal of the first sensor or the first actual ratio may be corrected in iterations, where in one iteration, a first correction value is determined for the signal of the first sensor or the first actual ratio, and in an iteration following this iteration, a second correction value is determined as a function of the signal of the first sensor corrected with the first correction value or the first actual ratio corrected with the first correction value. This permits a stepwise correction in which the values from the respective preceding iteration are plausibilized.

According to an example embodiment of the present invention, the device for correcting an offset in a signal of a first sensor for determining a residual oxygen content is designed to predetermine a reference ratio of air and fuel for an output of a catalytic converter, the device being designed to receive a signal which characterizes a first residual oxygen content in the exhaust gas upstream of the catalytic converter, the device being designed to determine a first actual ratio of air and fuel as a function of the first residual oxygen content, the device being designed to receive a signal which characterizes a second residual oxygen content in the exhaust gas downstream of the catalytic converter, the device being designed to determine a second actual ratio of air and fuel as a function of the second residual oxygen content, the device being designed to determine for a first actual ratio in the case where the second actual ratio is greater than the reference ratio, a first offset of this first actual ratio relative to the reference ratio, the device being designed to determine for a first actual ratio in the case where the second actual ratio is smaller than the reference ratio, a second offset of this first actual ratio relative to the reference ratio, and the device being designed to detect a deviation between the first offset and the second offset.

According to an example embodiment of the present invention, the device may be designed to correct the signal of the first sensor or the first actual ratio if the deviation between the first offset and the second offset is detected. Low emissions are achievable in this manner.

According to an example embodiment of the present invention, the device is designed preferably to determine a correction value as a function of the deviation or the deviation in terms of amount, and to correct the signal of the first sensor or the first actual ratio using the correction value. Low emissions are thereby attainable quickly in the case of large deviations.

According to an example embodiment of the present invention, the device is designed preferably to determine the correction value as a function of a factor, the deviation being multiplied by the factor. The correction is adjustable by way of the factor.

According to an example embodiment of the present invention, the device is designed preferably to predetermine a time characteristic of a manipulated variable for adjusting an air/fuel mixture whose combustion gives rise to the exhaust gas, particularly a time characteristic of the manipulated variable which includes a jump of the manipulated variable, a ramp-shaped characteristic of the manipulated variable, or a combination of a jump of the manipulated variable with a subsequent ramp of the manipulated variable. Low emissions are thereby attainable quickly.

According to an example embodiment of the present invention, the device is designed preferably to detect that the deviation is smaller in amount than a limit value, particularly zero, a correction being omitted if it is detected that the deviation is smaller in amount than a limit value, particularly zero. Consequently, the correction is avoidable for small deviations.

According to an example embodiment of the present invention, the device is designed preferably to correct the signal of the first sensor or the first actual ratio in iterations, where in one iteration, a first correction value is determined for the signal of the first sensor or the first actual ratio, and in an iteration following this iteration, a second correction value is determined as a function of the signal of the first sensor corrected with the first correction value or the first actual ratio corrected with the first correction value. In this way, in one iteration, the corrections of an iteration preceding it are able to be plausibilized.

Further advantageous specific embodiments of the present invention may be derived from the following description and the figures.

BRIEF DESCRIPTION OF THE DRAWINGS

FIG. 1 shows a schematic representation of an internal combustion engine with a catalytic converter.

FIG. 2 shows a flowchart with steps in a method for correcting a signal of a sensor of the internal combustion engine, according to an example embodiment of the present invention.

FIG. 3 shows a time characteristic of variables, according to an example embodiment of the present invention.

DETAILED DESCRIPTION OF EXAMPLE EMBODIMENTS

A method and a device 100 are described in the following, using as example an internal combustion engine 102 shown in FIG. 1, in which an air/fuel mixture is burned and its exhaust gas is expelled through a three-way catalytic converter 104, which is located in an exhaust pipe 106. Device 100 in the example is a control unit. Internal combustion engine 102 in the example is a gasoline engine.

The method and the device are not limited to this example, but rather are usable with other types of catalytic converters, as well.

In the event of an incomplete combustion of the air/fuel mixture in a gasoline engine, in addition to air and unburned fuel, nitrogen (N2), carbon dioxide (CO2) and water (H2O) as well as a variety of combustion products are expelled in an exhaust gas, of which hydrocarbons (HC), carbon monoxide (CO) and nitrogen oxides (HOx) are limited by law.

According to today's state of technological development, the current exhaust-gas limit values for motor vehicles can only be adhered to using a catalytic exhaust-gas treatment. The pollutant components named are able to be converted by the use of a three-way catalytic converter 104.

Using three-way catalytic converter 104, a simultaneously high conversion rate for HC, CO and NOx is achieved in a narrow range about a stochiometric operating point at $\lambda=1$. The stochiometric operating point represents an example for a reference ratio of air and fuel. The range about the stochiometric operating point is referred to as three-way catalytic-converter window. For example, the three-way catalytic-converter window is defined as a range of $\lambda \pm 0.001$ about the stochiometric operating point.

In order to operate three-way catalytic converter 104 in the three-way catalytic-converter window, in device 100, an engine management is provided with a lambda control which is based on the signals of lambda probes upstream and downstream of three-way catalytic converter 104.

In the example, a first sensor 108 is disposed as lambda probe upstream of three-way catalytic converter 104 and is connected via a first signal line 110 to device 100. A second sensor 112 in the example is disposed as lambda probe downstream of three-way catalytic converter 104 and is connected via a second signal line 114 to device 100.

First sensor 108 in the example is designed to determine a residual oxygen content of the exhaust gas and to transmit a value of the residual oxygen content in the form of an electric voltage to device 100. Device 100 is designed to identify a composition of the exhaust gas upstream of three-way catalytic converter 104 on the basis of this voltage.

Second sensor 112 in the example is designed to determine a residual oxygen content of the exhaust gas and to transmit a value of the residual oxygen content in the form of an electric voltage to device 100. Device 100 is designed to identify a composition of the exhaust gas downstream of three-way catalytic converter 104 on the basis of this voltage.

In the example, the lambda control determines at least one manipulated variable, with which a fuel quantity is supplied to internal combustion engine 102 for the operation. Internal combustion engine 102 is controlled with the manipulated variable via at least one control line 116. The manipulated variable is determined as a function of a reference variable of a lambda controller, the reference variable being corrected with a pre-control variable.

For the lambda control of a composition of the exhaust gas in the exhaust upstream of three-way catalytic converter 104, a residual oxygen content of the exhaust gas upstream of three-way catalytic converter 104 is measured by first sensor 108. The pre-control variable is determined as a function of this.

For determining the reference variable, in addition the exhaust gas downstream of three-way catalytic converter 104 is analyzed using second sensor 112. In the example, a residual oxygen content is determined in the exhaust gas downstream of three-way catalytic converter 104. The reference variable is determined as a function of this.

As second sensor 112 downstream of three-way catalytic converter 104, a two-step lambda probe is used in the example, which at $\lambda=1$, has a very steep characteristic curve, and therefore is able to indicate $\lambda=1$ very precisely.

The lambda controller is designed to correct small deviations from the reference ratio, e.g., $\lambda=1$, using the reference variable. The pre-control variable is determined in the example by a lambda pre-control. The lambda controller in the example is designed to be slow in comparison to the lambda precontrol.

The lambda pre-control is designed to rectify large deviations from λ=1 using the pre-control variable. As a result, the three-way catalytic-converter window is reached quickly again, for example, after phases with overrun fuel cutoff.

A departure from the three-way catalytic-converter window is not detectable until late on the basis of a voltage of the two-step lambda probe downstream of three-way catalytic converter 104.

An alternative for the control of three-way catalytic inverter 104 on the basis of the signal of second sensor 112 downstream of three-way catalytic converter 104 is a control of at least one average oxygen filling level of three-way catalytic converter 104.

This at least one average filling level is not measurable directly. In the example, the at least one average filling level is modeled using a filling-level model. In one example, device 100 is designed to carry out a model-based control of the at least one average filling level of three-way catalytic converter 104 as described, for instance, in German Patent Application No. DE 10 2016 222 418 A1.

The signal of first sensor 108 is converted by an input-emissions model into one or more input variables for the filling-level model. Using the variables calculated by the input-emissions model and possibly additional input variables, e.g., exhaust-gas temperature or catalytic-converter temperature, exhaust-gas mass flow and instantaneous maximum oxygen storage capacity of three-way catalytic converter 104, first of all, at least one filling level of three-way catalytic converter 104 is modeled with the aid of a catalytic-converter model. This is described hereinafter using an average oxygen filling level as example. Secondly, with the aid of the catalytic-converter model, concentrations of the individual exhaust-gas components at the output of three-way catalytic converter 104 are calculated. They are converted for the adaptation into a signal, which is able to be compared to the signal of second sensor 112.

The average oxygen filling level is adjusted in the example to a setpoint value which minimizes the likelihood of a departure from the catalytic-converter window. This leads to the lowest emissions possible, at best, to minimal emissions. The setpoint value is preferably prefiltered. The prefiltered setpoint value for the oxygen filling level is used as reference variable. The output signals of the pre-control and of the lambda controller are added up. The sum signal represents a setpoint ratio upstream of three-way catalytic converter 104. Manipulated variable 116 is determined as a function of the setpoint ratio.

A multistage compensation of measuring and model uncertainties for such a control is described in German Patent Application No. DE 10 2018 251 725 A1

Rapid elimination of a relatively large deviation in terms of amount between a ratio of air and fuel upstream of three-way catalytic converter 104 and the ratio of air and fuel downstream of three-way catalytic converter 104 is, of course, possible in principle. For that, however, it is assumed that the ratio of air and fuel upstream of three-way catalytic converter 104 is determined correctly by first sensor 108 and the ratio of air and fuel downstream of three-way catalytic converter 104 is determined correctly by second sensor 112 at least under steady-state operating conditions.

Measurements with different second sensors 112, e.g., two-step lambda probes and broadband lambda probes, downstream of three-way catalytic converter 104 show that this assumption is not necessarily fulfilled. In particular, deviations larger in amount are often not sensed correctly in practice.

In exemplary measurements, a two-step lambda probe used as second sensor 112 downstream of three-way catalytic converter 104 indicates only 1% for an actual deviation of 5%.

In other exemplary measurements, a two-step lambda probe used as second sensor 112 downstream of three-way catalytic converter 104 overestimates an actual deviation.

Possible reasons for this are, for example, a cross sensitivity of the two-step lambda probe for certain exhaust-gas components such as hydrogen or a temperature dependency of the two-step lambda probe or dependencies of the two-step lambda probe on an engine operating point, which are not taken sufficiently into account in a probe characteristic curve. One possible cause is a flat characteristic of the voltage-lambda characteristic curve away from λ=1.

In the example, it is provided to model the at least one filling level of three-way catalytic converter 104 using a model.

Device 100 is designed to correct an offset in a signal of first sensor 108.

Device 100 is designed to predetermine the reference ratio of air and fuel in the exhaust gas at an output of catalytic converter 104.

Device 100 is designed to receive a signal that characterizes a first residual oxygen content in the exhaust gas upstream of catalytic converter 104, which is measured by first sensor 108.

Device 100 is designed to determine a first actual ratio of air and fuel as a function of the first residual oxygen content.

Device 100 is designed to receive a signal that characterizes a second residual oxygen content in the exhaust gas downstream of catalytic converter 104, which is measured by a second sensor 112.

Device 100 is designed to determine a second actual ratio of air and fuel as a function of the second residual oxygen content.

For a first actual ratio in the case where the second actual ratio is greater than the reference ratio, device 100 is designed to determine a first offset of this first actual ratio relative to the reference ratio.

For a first actual ratio in the case where the second actual ratio is smaller than the reference ratio, device 100 is designed to determine a second offset of this first actual ratio relative to the reference ratio.

Device 100 is designed to correct the signal of first sensor 108 or the first actual ratio if a deviation is detected between the first offset and the second offset. In one example, device 100 is designed to detect that the deviation is smaller in amount than a limit value, particularly zero, a correction being omitted if it is detected that the deviation is smaller in amount than a limit value, particularly zero.

In one example, device 100 is designed to correct the signal of first sensor 108 with a correction value. In one example, device 100 is designed to correct the first actual ratio with a correction value.

The device is designed to determine the correction value as a function of the deviation. In the example, the device is designed to determine the correction value as a function of the deviation in terms of amount, that is, the difference in terms of amount between the first and second offset.

Device 100 is designed, for example, to determine the correction value as a function of a factor, and to multiply the deviation by the factor. For instance, the factor may be established in the application. As an example, the factor amounts to 75% or 80%. The factor may also be smaller or larger, for example, may be in the range of 50% to 90%.

In one example, device 100 is designed to predetermine a time characteristic of manipulated variable 116 for adjusting the air/fuel mixture. Manipulated variable 116 in the example is a setpoint value, deviating from the reference ratio, for the second actual ratio.

In one example, device 100 is designed to predetermine the time characteristic of manipulated variable 116 in such a way that the time characteristic of manipulated variable 116 includes a jump of manipulated variable 116. In one example, device 100 is designed to predetermine a time characteristic of manipulated variable 116 in such a way that the time characteristic of manipulated variable 116 includes a combination of a jump of manipulated variable 116 with a subsequent ramp of manipulated variable 116.

In one example, device 100 is designed to correct the signal of first sensor 108 or the first actual ratio in iterations.

In one example, device 100 is designed to determine in one iteration, a first correction value for the signal of the first sensor. In one example, device 100 is designed, in an iteration following this iteration, to determine a second correction value as a function of the signal of first sensor 108 corrected with the first correction value. In one example, device 100 is designed to determine in one iteration, a first correction value for the first actual ratio. In one example, device 100 is designed, in an iteration following this iteration, to determine a second correction value as a function of the first actual ratio corrected with the first correction value.

A method for operating internal combustion engine 102 is described in the following with reference to FIG. 2.

The method includes a step 200.

In step 200, a reference ratio of air and fuel in the exhaust gas at an output of catalytic converter 104 is predetermined.

A step 202 is then carried out.

In step 202, the time characteristic of manipulated variable 116 for adjusting the air/fuel mixture is predetermined.

In one example, the time characteristic of manipulated variable 116 includes the jump of manipulated variable 116. In one example, the time characteristic of manipulated variable 116 includes the ramp of manipulated variable 116. In one example, the time characteristic of manipulated variable 116 includes the combination of the jump of manipulated variable 116 with the subsequent ramp of manipulated variable 116.

A step 204 is then carried out.

In step 204, the first residual oxygen content is measured by first sensor 108.

A step 206 is then carried out.

In step 206, the first actual ratio of air and fuel is determined as a function of the first residual oxygen content.

A step 208 is then carried out.

In step 208, the second residual oxygen content is measured by second sensor 112.

A step 210 is then carried out.

In step 210, the second actual ratio of air and fuel is determined as a function of the second residual oxygen content.

A step 212 is then carried out.

In step 212, for the first actual ratio in the case where the second actual ratio is greater than the reference ratio, the first offset of the first actual ratio relative to the reference ratio is determined.

A step 214 is then carried out.

In step 214, for the first actual ratio in the case where the second actual ratio is smaller than the reference ratio, the second offset of the first actual ratio relative to the reference ratio is determined.

A step 216 is then carried out.

In step 216, it is checked whether or not the deviation between the first offset and the second offset is detected.

If the deviation is detected, a step 218 is carried out. Otherwise, step 200 is carried out.

In one example, the correction is omitted if it is detected that the deviation is smaller in amount than a limit value, particularly zero. In other words, in this case, after step 216, step 200 is carried out.

In step 218, the signal of first sensor 108 or the first actual ratio is corrected.

In one example, the signal of first sensor 108 is corrected with the correction value. In one example, the first actual ratio is corrected with the correction value.

The correction value is determined as a function of the deviation. In the example, the correction value is determined as a function of the deviation in terms of amount between the first offset and the second offset.

The correction value may be determined as a function of a factor, the deviation being multiplied by the factor.

Step 200 is then carried out.

In other words, in this iteration, the signal of first sensor 108 or the first actual ratio is corrected with the first correction value.

In the iteration following this iteration, the second correction value is determined as a function of the signal of first sensor 108 corrected with the first correction value or as a function of the first actual ratio corrected with the first correction value.

FIG. 3 shows a time characteristic of variables which ensues upon execution of the method by the use of manipulated variable 116 described for adjusting the air/fuel mixture.

The time characteristic is subdivided into a first phase 302, a second phase 304 and a third phase 306. Top graph 308 shows a time characteristic of an oxygen filling level in three-way catalytic converter 104. Center graph 310 shows a voltage characteristic of second sensor 112. Bottom graph 312 shows a characteristic of the first actual ratio with values between 0 and 1, the value 1 representing the reference ratio. In addition, in bottom graph 312, a characteristic of a presumed correction value is represented with a dashed line, and a characteristic of an already learned and plausibilized correction value is represented with a solid line, starting from 0. In the example, the characteristic of the first actual ratio initially changes by $\Delta\lambda 1$, the presumed correction value changing by $x*\Delta\lambda 1$ and the learned and plausibilized correction value not changing. In the example, the characteristic of the first actual ratio then changes by $\Delta\lambda 2$, the presumed correction value changing by $x*\Delta\lambda 2$ and the learned and plausibilized correction value changing by $x*\Delta\lambda 1$.

In first phase 302, internal combustion engine 102 is operated in a normal state. In second phase 304, there is suspicion of an error, that is, the suspicion that the deviation exists. In third phase 306, internal combustion engine 102 is operated in a manner adapted to the deviation. In other words, the signal of second sensor 112 is corrected with the correction value.

A first reference voltage 314, e.g., 710 mV, a second reference voltage 316, e.g., 650 mV and a third reference voltage 318, e.g., 350 mV are indicated for the signal of second sensor 112. Second reference voltage 316 corresponds to a lower limit of the catalytic-converter window for the first actual ratio of, e.g., $\lambda=0.999$. Third reference voltage 318 corresponds to an upper limit of the catalytic-converter window for the first actual ratio of, e.g., $\lambda=1.001$. Other limits of the catalytic-converter window are handled correspondingly.

In the example, the signal of second sensor 112 begins at first reference voltage 314 and then falls below third reference voltage 318. The signal of second sensor 112 subsequently rises again above second reference voltage 316. In the example, this repeats once in first phase 302 and three times in second phase 304. At the same time, the signal of second sensor 112 in the example remains below first reference voltage 314 up to the end of second phase 304. In third phase 306, the signal of second sensor 112 rises from a value below third reference voltage 318 up to the value of first reference voltage 314 and then bounces around the value of first reference voltage 314. In the state thereby achieved, the deviation is corrected by the correction value.

First phase 302 includes a first reinitialization phase 320 of three-way catalytic converter 104, in which the oxygen filling level, which in the example may assume values between 0 and 1, is increased from a first value 322 greater than 0 abruptly to a second value 324 less than 1, and then is decreased in ramp-like fashion to first value 322. In this first reinitialization phase 320, an intervention is carried out into the lambda control.

The time characteristic of the actual ratio begins in first phase 302 with a value of 1 and drops abruptly with the jump of the oxygen filling level to a value, lower in contrast, of greater than 0. While the oxygen filling level decreases in ramp-like fashion, the actual ratio at first remains unchanged in the example and then increases in ramp-like fashion to the value 1.

In the example, second phase 304 begins in a first iteration with a ramp-like decrease of the actual ratio beginning at a value of 1, followed by a ramp-like increase of the actual ratio up to a value lower than 1. During the ramp-like decrease, the signal of second sensor 112 rises with increasing gradient up to a value between first reference voltage 314 and second reference voltage 316. When the signal of second sensor 112 reaches second reference voltage 316, the ramp-like increase of the actual ratio takes place until the signal of second sensor 112 reaches third reference voltage 318. At this point in time, the deviation and the correction value are determined. In FIG. 3, two further iterations are depicted in second phase 304, which proceed in corresponding manner. At the end of the third iteration, the correction value is determined iteratively and is used in third phase 306 for the correction.

Third phase 306 includes a second reinitialization phase 326 of three-way catalytic converter 104, in which the oxygen filling level, which in the example may assume values between 0 and 1, is increased abruptly from a first value 322 greater than 0 to a second value 324 less than 1, and then is decreased in ramp-like fashion to first value 322. In this second reinitialization phase 326, an intervention is carried out into the lambda control.

The time characteristic of the actual ratio begins in third phase 306 with a value of 1 and drops abruptly with the jump of the oxygen filling level to a value, lower in contrast, of greater than 0. While the oxygen filling level decreases in ramp-like fashion, the actual ratio at first remains unchanged in the example and then increases in ramp-like fashion to the value 1.

When second sensor 112 unambiguously indicates a high or a low voltage, its voltage signal correlates with an instantaneous filling level of three-way catalytic converter 104. This is especially the case when this voltage signal does not correspond to an actual ratio in the catalytic-converter window. In this case, three-way catalytic converter 104 is either freed of oxygen to the extent that rich exhaust gas is flowing out of three-way catalytic converter 104, or is filled with oxygen to the extent that lean exhaust gas is flowing out of three-way catalytic converter 104. This is utilized to reinitialize one or more modeled filling levels. In the reinitialization in the example, the modeled oxygen filling levels are reinitialized in several axial areas of three-way catalytic converter 104, if an unambiguously high or low voltage of the lambda probe occurs downstream of three-way catalytic converter 104. Owing to this reinitialization, the modeled filling levels of three-way catalytic converter 104 are brought into a defined state in which they agree at least approximately well with the corresponding filling levels of real three-way catalytic converter 104.

Such a discontinuous reinitialization of the modeled filling levels leads in first phase 302 to a deviation of the average modeled filling level from the setpoint value, the deviation being corrected.

The reinitialization leads to an adjustment of the air/fuel mixture in the direction of the setpoint value of the filling-level control and brings three-way catalytic converter 104 very quickly in the direction of the catalytic-converter window. It thus leads directly to an improvement of emissions and simultaneously brings three-way catalytic converter 104 into a defined state in which, as expected, the reference ratio of $\lambda=1$, for example, appears downstream of three-way catalytic converter 104.

However, the catalytic-converter window and the reference ratio of, e.g., $\lambda=1$ are actually only reached when the signal of first sensor 108, on which the modeling of the adjusted oxygen filling level is based, exhibits no deviation. But if this is the case, then $\lambda=1$ does not appear downstream of three-way catalytic converter 104, but rather a second actual ratio differing by this deviation from the reference value of, e.g., $\lambda=1$.

In the example, an emissions minimum is assumed at the reference value of, e.g., $\lambda=1$. The method is also usable if the setpoint value for the oxygen filling level to attain minimal emissions is a ratio differing slightly from $\lambda=1$.

If within a defined period of time, for example, in the sense of an exhaust-gas mass pushed through, following an alignment of the modeled oxygen filling levels of the catalytic converter with the signal of second sensor 112, e.g., by the reinitialization of the modeled filling levels, a marked deviation is ascertained between the measured second actual ratio and the reference ratio, in second phase 304, a deviation is assumed in the signal of first sensor 108. The recognition of this deviation is possible in the example because the signal of second sensor 112 is regarded as trustworthy and second sensor 112 is operational. Optionally, a waiting time may be provided which must be observed before the deviation is detected or evaluated. Optionally, a minimum quantity of exhaust gas may be designated, which must be put through at the least, before the deviation is detected or evaluated.

If the deviation is detected, or if the deviation exceeds the limit value, at the beginning of second phase 304, the model-based control of the filling level in three-way catalytic converter 104 is interrupted or reduced for a time. Preferably, the filling level continues to be observed or modeled with the aid of the filling-level model. Manipulated variable 116 thus resulting takes into account its output variable, though only reduced, or inhibits its influence completely.

In second phase 304, the method described above is employed, which facilitates a rapid correction of the signal of first sensor 104.

The method brings about an adjustment of the air/fuel mixture and thus of the first actual ratio. As a consequence, a reaction takes place in three-way catalytic converter 104, which alters the signal of second sensor 112.

Various time characteristics of the adjustment of the air/fuel mixture are possible, of which the combination of the jump with the subsequent ramp is illustrated in FIG. 3. For example, at first the air/fuel mixture is adjusted in the direction of a rich mixture, until such time as the signal of second sensor 112 as shown in FIG. 3, coming out of a range of a lean air/fuel mixture, reaches the reference ratio of $\lambda=1$ in the example, and then indicates a slightly rich air/fuel mixture, for example, $\lambda=0.999$. The method may also provide an adjustment up to the reference ratio of $\lambda=1$ in the example, without a slightly rich air/fuel mixture being set.

If this is the case, the direction of the adjustment of the air/fuel mixture is changed, here, for example, in the direction of a lean air/fuel mixture, until the signal of second sensor 112 as shown in FIG. 3, coming out of a range of a rich air/fuel mixture, reaches the reference ratio of $\lambda=1$ in the example, and then indicates a slightly lean air/fuel mixture, for example, $\lambda=0.001$. The method may also provide an adjustment up to the reference ratio of $\lambda=1$ in the example, without a slightly lean air/fuel mixture being set.

In order to achieve the greatest possible accuracy of the ascertained deviation, it may be provided to determine the type and the time characteristic of the change of manipulated variable 116 as a function of the amount of the deviation.

A reaction of second sensor 112—delayed as a result of finite system dynamics—to the adjustment of the air/fuel mixture is thus taken into account. For example, it is especially advantageous if, in response to a deviation which is great in terms of amount, manipulated variable 116 initially proceeds in stepped fashion and then in ramp-like fashion in order to achieve the reference ratio or a ratio in the catalytic-converter window as quickly as possible downstream of three-way catalytic converter 104. On the other hand, in the case of a small deviation in terms of amount, it is advantageous, for example, if manipulated variable 116 proceeds in a ramp shape from the beginning.

Since second sensor 112 usually has very high accuracy in the catalytic-converter window, a difference of the change of manipulated variable 116 toward rich or lean necessary for the adjustments of the air/fuel mixture until second sensor 112 indicates a slightly rich or lean air/fuel mixture corresponds with relatively high accuracy to an actual deviation, even if the lambda indicated by second sensor 112 at the beginning of the adjustment should be falsified because of a defective vision of second sensor 112 away from the reference ratio. The accuracy of the ascertainment of the deviation is further increased owing to the fact that an approach toward the reference ratio or a slight exceeding of the reference ratio at second sensor 112 with respect to the air/fuel mixture takes place both from the lean and from the rich side. Thus, influences of defective vision are ruled out almost completely in the area of the reference ratio, as well.

The method offers several advantages. First of all, the speed of the correction is increased considerably, since because the reference ratio is exceeded repeatedly at second sensor 112, the deviation is quantified very quickly and precisely. Because the adjustments are repeated several times, higher factors are possible for the deviation than when using other methods, without adversely affecting the robustness of the correction.

Due to the rich adjustments and lean adjustments following each other repeatedly, a deviation in the signal of first sensor 108 is compensated for stepwise very quickly, and at the same time, an effect of the respective previous compensation step is plausibilized. The method therefore leads directly to a compensation of a deviation of the second actual ratio from the reference ratio, caused by a deviation of the signal, so that lower emissions result more quickly than when using previous methods.

What is claimed is:

1. A method for correcting an offset in a signal of a first sensor configured to determine a residual oxygen content in an exhaust gas, the method comprising the following steps:
   predetermining a reference ratio of air and fuel is for an output of a catalytic converter;
   measuring, by the first sensor, a first residual oxygen content in the exhaust gas upstream of the catalytic converter;
   determining a first actual ratio of air and fuel as a function of the first residual oxygen content;
   measuring a second residual oxygen content in the exhaust gas downstream of the catalytic converter by a second sensor which is configured to determine residual oxygen content in the exhaust gas;
   determining a second actual ratio of air and fuel as a function of the second residual oxygen content;
   determining a first offset of a first actual ratio relative to the reference ratio for the first actual ratio when the second actual ratio is greater than the reference ratio;
   determining a second offset of a first actual ratio relative to the reference ratio for the first actual ratio when the second actual ratio is smaller than the reference ratio; and
   detecting a deviation between the first offset and the second offset.

2. The method as recited in claim 1, wherein if the deviation between the first offset and the second offset is detected, the signal of the first sensor or the first actual ratio is corrected.

3. The method as recited in claim 2, wherein the signal of the first sensor or the first actual ratio is corrected with a correction value, the correction value being determined as a function of the deviation or the deviation in terms of amount.

4. The method as recited in claim 3, wherein the correction value is determined as a function of a factor, the deviation being multiplied by the factor.

5. The method as recited in claim 1, wherein a time characteristic of a manipulated variable is predetermined for adjusting an air/fuel mixture whose combustion gives rise to the exhaust gas, the time characteristic being a time characteristic of the manipulated variable which includes a jump of the manipulated variable, or a ramp-shaped characteristic of the manipulated variable, or a combination of a jump of the manipulated variable with a subsequent ramp of the manipulated variable.

6. The method as recited in claim 1, wherein a correction is omitted when it is detected that the deviation is smaller in amount than a limit value.

7. The method as recited in claim 1, wherein the signal of the first sensor or the first actual ratio is corrected in iterations, wherein in one iteration, a first correction value is determined for the signal of the first sensor or the first actual ratio, and in an iteration following the one iteration, a second correction value is determined as a function of the signal of the first sensor corrected with the first correction value or the first actual ratio corrected with the first correction value.

8. A device configured to correct an offset in a signal of a first sensor configured to determine a residual oxygen content, the device being configured to:
   predetermine a reference ratio of air and fuel for an output of a catalytic converter;

receive a signal that characterizes a first residual oxygen content in the exhaust gas upstream of the catalytic converter;

determine a first actual ratio of air and fuel as a function of the first residual oxygen content;

receive a signal that characterizes a second residual oxygen content in the exhaust gas downstream of the catalytic converter;

determine a second actual ratio of air and fuel as a function of the second residual oxygen content;

determine for a first actual ratio in the case where the second actual ratio is greater than the reference ratio, a first offset of the first actual ratio relative to the reference ratio;

determine for a first actual ratio in the case where the second actual ratio is smaller than the reference ratio, a second offset of the first actual ratio relative to the reference ratio; and detect a deviation between the first offset and the second offset.

9. The device as recited in claim 8, wherein the device is configured to correct the signal of the first sensor or the first actual ratio if the deviation between the first offset and the second offset is detected.

10. The device as recited in claim 9, wherein the device is configured to determine a correction value as a function of the deviation or the deviation in terms of amount, and to correct the signal of the first sensor or the first actual ratio with the correction value.

11. The device as recited in claim 10, wherein the device is configured to determine the correction value as a function of a factor, the deviation being multiplied by the factor.

12. The device as recited in claim 8, wherein the device is configured to predetermine a time characteristic of a manipulated variable for adjusting an air/fuel mixture whose combustion gives rise to the exhaust gas, the time characteristic being a time characteristic of the manipulated variable which includes a jump of the manipulated variable, or a ramp-shaped characteristic of the manipulated variable, or a combination of a jump of the manipulated variable with a subsequent ramp of the manipulated variable.

13. The device as recited in claim 8, wherein the device is configured to detect that the deviation is smaller in amount than a limit value, a correction being omitted if it is detected that the deviation is smaller than the limit value.

14. The device as recited in claim 9, wherein the device is configured to correct the signal of the first sensor or the first actual ratio in iterations, where in one iteration, a first correction value is determined for the signal of the first sensor or the first actual ratio, and in an iteration following the one iteration, a second correction value is determined as a function of the signal of the first sensor corrected with the first correction value or the first actual ratio corrected with the first correction value.

* * * * *